United States Patent [19]
Overton

[11] Patent Number: 5,964,852
[45] Date of Patent: Oct. 12, 1999

[54] PROGRAMMABLE DATA PORT INTERFACE ADAPTER

[75] Inventor: David T. Overton, Cedar Rapids, Iowa

[73] Assignee: Rockwell International Corporation, Costa Mesa, Calif.

[21] Appl. No.: 08/745,886

[22] Filed: Nov. 8, 1996

[51] Int. Cl.$^6$ .................................................. G06F 3/00
[52] U.S. Cl. .......................... 710/62; 710/129; 710/64; 395/500
[58] Field of Search ................... 395/281–283, 395/882–884, 885–886, 889–893, 284–285, 200.8, 200.47, 309, 828, 830, 834, 836, 500

[56] References Cited

U.S. PATENT DOCUMENTS

| | | | |
|---|---|---|---|
| 4,868,783 | 9/1989 | Anderson et al. ...................... | 395/281 |
| 4,884,287 | 11/1989 | Jones et al. .............................. | 375/377 |
| 5,226,040 | 7/1993 | Noble, III et al. ...................... | 370/257 |
| 5,457,784 | 10/1995 | Wells et al. ............................... | 395/829 |
| 5,469,545 | 11/1995 | Vanbuskirk et al. ............... | 395/200.01 |
| 5,548,782 | 8/1996 | Michael et al. .......................... | 395/835 |
| 5,564,061 | 10/1996 | Davies et al. ............................ | 710/64 |
| 5,574,859 | 11/1996 | Yeh ..................................... | 395/200.01 |
| 5,581,741 | 12/1996 | Clark et al. ............................ | 395/500 |
| 5,628,027 | 5/1997 | Belmont ................................. | 395/821 |
| 5,727,170 | 3/1998 | Michell et al. ......................... | 395/285 |

*Primary Examiner*—Ayaz R. Sheikh
*Assistant Examiner*—Raymond N Phan
*Attorney, Agent, or Firm*—Kyle Eppele; James P. O'Shaughnessy

[57] ABSTRACT

A programmable data port interface adapter for a mobile data terminal is disclosed which provides selectable configuration of an external device data port connector for accommodating multiple types of data port devices. An RS-232 type data port may be configured to a J1708 type data port such that the mobile data terminal may communicate with RS-232 type devices in addition to J1708 type devices. Data port configuration and control is implemented by software thereby eliminating the need to upgrade of modify data port hardware to accommodate multiple data port type devices. Multiple data port connectors may be utilized in a multiple programmable combinations and configurations. Configuration information may be received by the mobile data terminal or through remote communications such as an RF or cellular network.

2 Claims, 1 Drawing Sheet

PROGRAMMABLE DATA PORT INTERFACE ADAPTER

BACKGROUND OF THE INVENTION

The present invention relates to data port switching circuits in mobile data terminals and more particularly to a programmable data port interface adapter.

There are many applications in which it is desirable for a computer type device to be able to communicate with a variety of external devices. For example, in a public mass transit environment, it would be advantageous for a mobile data terminal having data ports for connecting with RS-232 peripheral devices (e.g., printers, bar code readers, etc.) to be able to also accommodate input from J1708 peripheral devices (e.g., ADA Annunciator systems or passenger counting systems). Typical prior data terminal systems having RS-232 ports do not accommodate J1708 devices. Further, if connection to both J1708 and RS-232 ports is desired, dedicated ports for each type of device is typically required which are mutually exclusive to the other type of data port. Devices designed for RS-232 ports would require costly and time consuming hardware configurations to accommodate J1708 ports. Further, standard hardware switching circuits would typically add to the complexity and cost of the mobile data terminal.

It is therefore an object of the invention to provide a programmable data port interface adapter allowing for one type of data port to be seamlessly converted to another type of data port in an interface adapter system.

It is another object of the present invention to provide a mobile data terminal having modifiable data ports without requiring hardware modifications of the data terminal.

It is yet a further object of the invention to provide an interface adapter having a reconfigurable data port that dynamically adjusts the data port type according to the attached peripheral device.

SUMMARY OF THE INVENTION

The present invention constitutes a programmable data port interface adapter that allows for multiple data port configurations for various peripheral devices. The data port type switching may be implemented via software control. No hardware modification is required to implement data port configuration switching.

In an exemplary embodiment, a mobile data terminal designed to connect to common RS-232 type devices may be programmably configured to accommodate and communicate with other types of peripheral devices such as J1708 type devices with the use of the interface adapter.

DESCRIPTION OF THE PREFERRED EMBODIMENT

Figure 1:
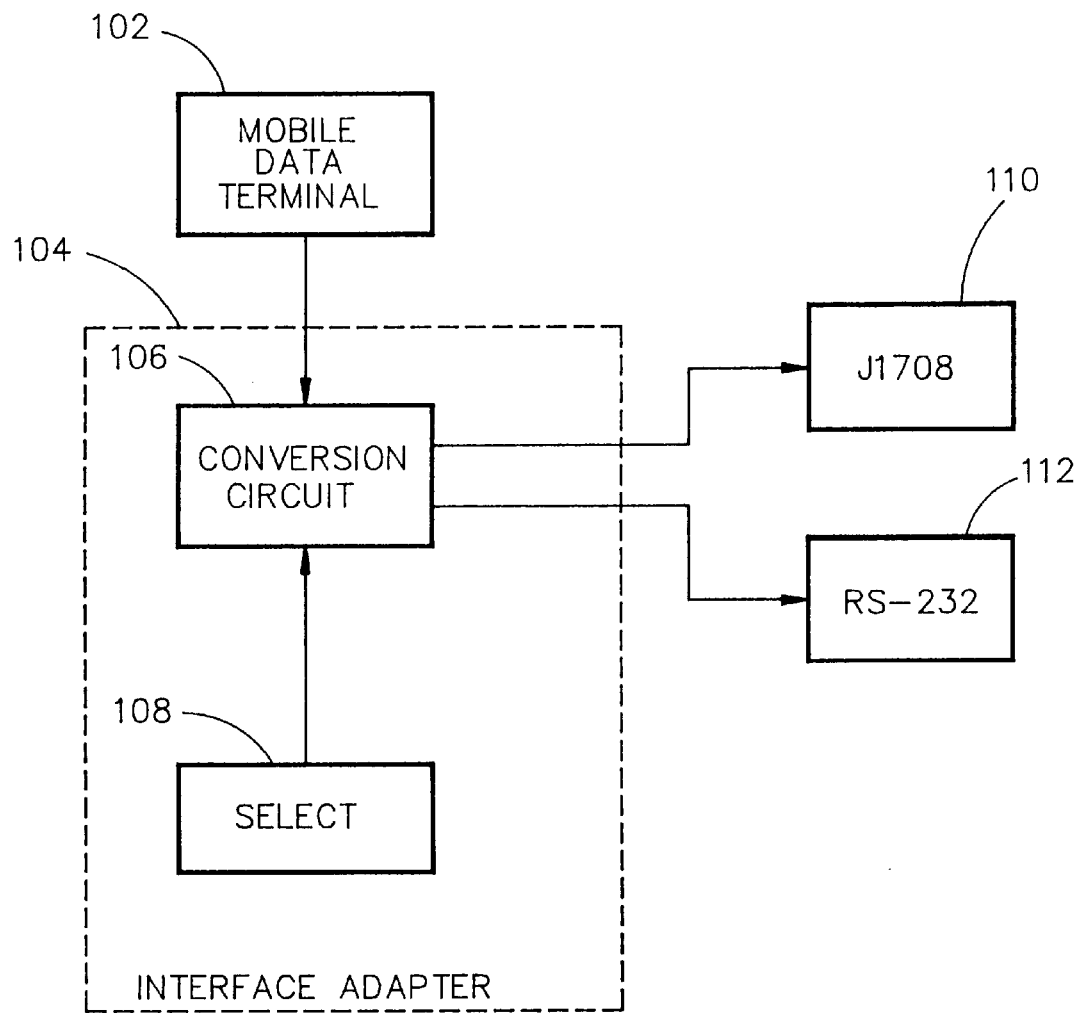
FIG. 1 illustrates a conceptual block diagram of the programmable data port interface in accordance with the present invention.

Referring now to FIG. 1, a conceptual block diagram of the programmable data port interface adapter of the present invention is shown. A mobile data terminal ("MOBILE DATA TERMINAL") 102 may be utilized as an in field data collection device for collecting information for subsequent processing and analysis. The mobile data terminal 102 communicates with a flexible interface adapter ("INTERFACE ADAPTER") 104 which is utilized to provide interfacing functions between the mobile data terminal 102 and external peripheral devices. The interface adapter 104 includes a programmable conversion circuit ("CONVERSION CIRCUIT") 106 which receives data communications from the mobile data terminal 102.

The conversion circuit includes standard serial port connectors (not shown) to which external devices may be connected to communicate with the mobile data terminal 102. The interface adapter 104 further includes a data port selection control ("SELECT") 108 for controlling the selection of the type of data port to be configured. The interface adapter 104 connects to external devices such as J1708 device ("J1708") 110 and RS-232 device ("RS-232") 112.

The data port selection control 108 operates to switch the configuration of the interface adapter 104 to provide the correct data port configuration for the appropriate external device (110, 112). A data port connector may be utilized which provides physical data port connections for both RS-232 and J1708 devices such that both an RS-232 and a J1708 device may be connected to the mobile data terminal 102 simultaneously. One or the other of the devices may be selected by switching between the provided physical data port connections. All switching of the connections is implemented by the interface adapter 104 via software control. Multiple data ports connectors may be provided on the mobile data terminal. By software control with the interface adapter 104, each of the data ports may be configured to a particular data port type. Thus, any combination or mix of external devices may be simultaneously connected to and communicate with the mobile data terminal 102 according to any desired peripheral device utilization schema.

Further, by utilization of software reconfiguration of the data ports, new switching code may be added for the interface adapter as port type needs and configurations are changed for the data terminal 102. Further, for remote installations of the mobile data terminal, the data port configuration may be remotely implemented through a radio-frequency or cellular linkage from a base station or host computer.

The following source code written in "C" programming language includes three subroutines which may be implemented by the interface adapter to control data port configuration switching between a J1708 serial port configuration and an RS-232 serial port configuration. Further code may be utilized to integrate the interface adapter into a particular data terminal system.

```
/*-------------------------------------------------------------------
**              Typedefs
**-------------------------------------------------------------------
typedef unsigned char UBYTE;   /* Unsigned 8 bit quantity */
/*-------------------------------------------------------------------
**              Defines
**-------------------------------------------------------------------
#define RS232_5         0x04 /* enable rs-232 on comm 5 */
```

-continued

```
#define J1708_5          0x04 /* enable j-1708 on comm 5 */
#define RS232_6          0x08 /* enable rs-232 on comm 6 */
#define J1708_6          0x08 /* enable j-1708 on comm 6 */
#defineON 1
#define OFF 0
extern volatile UBYTE SCC_POS_2       /* Start Cntr Cmd, Set Output Port Pins */
extern volatile UBYTE SCC_POC_2;      /* Stop Cntr Cmd, Clr Output Port Pins
*/
/*-------------------------------------------------------------------------
**              Function Prototypes
**-------------------------------------------------------------------------
*/
static void set_rs232_j1708( GENMSG *ptr);
void en232_5( UBYTE on_off);
void en232_6( UBYTE on_off);
/*-------------------------------------------------------------------------
** SUBROUTINE:      set_rs232_1708
**
** Description: configures comm5 or comm6 for rs232 orj1708
**
** Returns:     void
**
** Special Notes: sends ack if port number is ok, else sends nak to mdt
**
**-------------------------------------------------------------------------
*/
static void set_rs232_1708( GENMSG *ptr )
{
    BUFFER *outptr;
    GENMSG *outmsgptr;
    UBYTE ack_nak;
    ack_nak = ACK;
    if ( ptr -> msg.rs232_1708.port_number == 5)
    {
        en232_5( ptr -> msg.rs232_1708.set_reset);
    }
    else if ( ptr -> msg.rs232_1708.port_number == 6)
    {
        en232_6( ptr -> msg.rs232_1708.set_reset);
    }
    else
    {
        /* bad port number in message */
        ack_nak = NAK;
    }
    outptr = OutBufReq();
    outmsgptr = &( outptr -> message);
    setmem (&( outmsgptr -> msg.rs_j_ACK), 0, sizeof( outmsgptr ->
msg.rs_j_ACK ));
    outmsgptr -> msg.rs_j_ACK.ack_nak = ack_nak;
    mdt_ready_ip_msg( RS232_J1708_ACK_MSG_ID
                    outmsgptr,
                    sizeof( outmsgptr -> msg.rs_j_ACK),
                    0,
                    FALSE);
    OSQPost( MDTLoPrioQPtr, outptr );
}
/*-------------------------------------------------------------------------
** SUBROUTINE:      en232_5
**
** Description: enables RS232 or J1708 communications for COMM5
**
** Returns:     void
**
** Special Notes: 1 = RS232, 0 = J1708
**
**-------------------------------------------------------------------------
*/
void en232_5( UBYTE on_off)
{
    if(on_off == ON)
    {
        /* clear the bit in OPCR, which sets the bit at OPx */
        SCC_POC_2 = RS232_5
    }
    else
    {
        SCC_POS_2 = J1708_5;
    }
}
```

-continued

```
/*------------------------------------------------------------------------
** SUBROUTINE:    en232_6
**
** Description: enables RS232 or J1708 communications for COMM6
**
** Returns:       void
**
** Special Notes: 1 = RS232, 0 = J1708
**
**------------------------------------------------------------------------
*/
void en232_6( UBYTE on_off)
{
    if( on_off == ON)
    {
        /* clear the bit in OPCR, which sets the bit at OPx */
        SCC_POC_2 = RS232_6;
    }
    else
    {
        SCC_POS 2 = J1708_6;
    }
}
```

The set_rs232_j1708( ) subroutine may be utilized upon the interface adapter 104 receiving a message identification from the mobile data terminal 102 directing the configuration of either communication port 5 or 6. The subroutine deciphers the message and determines which communication port is to be configured and which type of data port is to be configured. The subroutine then calls either subroutine en232_5( ) or en232_6( ) to implement configuration of the data ports.

The en232_5( ) subroutine sets a discrete output, EN232-5, to either a logical zero value or a logical one value based upon whether an ON or OFF is received. In hardware, EN232-5 is a digital control signal used to set up the required logic that configures the conversion circuitry and is controlled by the contents of variables SCC_POC_2 and SCC_POS_2. When EN232-5 has a logical value of one, communication port 5 is configured as an RS-232 data port. When EN232-5 has a logical value of zero, communication port 5 is configured as a J1708 data port.

The en232_6( ) subroutine sets a discrete output, EN232_6, to either a logical zero value or a logical one value based upon whether an ON or OFF is received. In hardware, EN232-6 is a digital control signal used to set up the required logic that configures the conversion circuitry and is controlled by the contents of variables SCC_POC_2 and SCC_POS_2. When EN232-6 has a logical value of one, communication port 6 is configured as an RS-232 data port. When EN232-6 has a logical value of zero, communication port 6 is configured as a J1708 data port.

It is believed that the programmable data port interface adapter of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A programmable data port interface adapter for providing a communication port interface between a mobile data terminal and an external device, said interface adapter comprising:

a conversion circuit operatively disposed between the mobile data terminal and the external device; and a data port selection control operatively connected to said conversion circuit for providing selection of a data port configuration according to the data port type of the external device;

wherein said interface adapter is operable to receive a remote radio frequency configuration signal.

2. A programmable data port interface adapter as claimed in claim 1 wherein said remote configuration signal is a cellular signal.

* * * * *